United States Patent
Ghatta et al.

[11] Patent Number: 6,054,500
[45] Date of Patent: Apr. 25, 2000

[54] FLEXIBLE POLYESTER FOAMS

[75] Inventors: Hussain Al Ghatta, Fiuggi; Renato Vosa, Casagiove; Tonino Severini, Colleferro; Sandro Cobror, Pozzilli, all of Italy

[73] Assignee: Sinco Ricerche, S.p.A., Italy

[21] Appl. No.: 09/208,028

[22] Filed: Dec. 9, 1998

[30] Foreign Application Priority Data

Dec. 17, 1997 [IT] Italy .................................. MI97A2793

[51] Int. Cl.$^7$ ....................................................... C08J 9/00
[52] U.S. Cl. ............................ 521/138; 521/182; 521/79; 521/81; 264/46.1
[58] Field of Search ..................................... 521/182, 138, 521/79, 81

[56] References Cited

FOREIGN PATENT DOCUMENTS

| 026 554 | 4/1981 | European Pat. Off. . |
| 547 032 | 6/1993 | European Pat. Off. . |
| 146 610 | 2/1981 | German Dem. Rep. . |

OTHER PUBLICATIONS

Patent Abstracts of Japan, vol. 015, No. 345, dated Sep. 3, 1991 re JP 03–134037 to Sekisui Plastics Co., Ltd., published Jun. 7, 1991.

Derwent database WPI search week 9804 re JP 09–291166 A to Kirin Brewery KK and Sekisui Plastics Co., Ltd., published Nov. 11, 1997.

European Search Report re EP 98123226.7, issued Jun. 17, 1999.

Primary Examiner—Morton Foelak
Attorney, Agent, or Firm—Cook, Alex, McFarron, Manzo, Cummings & Mehler, Ltd.

[57] ABSTRACT

A foamed cellular material which can be obtained from foamed aromatic polyester resins with a bulk density of 50 to 700 kg/m3 by heating in vacuum to temperatures which are higher than the Tg of the material and lower than its melting point. The foamed material, generally in the form of a sheet or panel, has high-level characteristics in terms of flexibility and dimensional thermostability depending on the degree of crystallinity after the vacuum treatment.

29 Claims, No Drawings

FLEXIBLE POLYESTER FOAMS

DESCRIPTION

The present invention relates to foamed cellular materials (foams) derived from polyester resin, comprising materials having high flexibility and satisfactory elastic recovery as well as thermostable and flexible materials, and to their preparation method.

Conventional foamed polyester materials have valuable mechanical properties but poor flexibility.

The rigidity of the material excludes them from applications where flexibility is an essential requirement.

U.S. Pat. No. 5,110,844 describes foamed polyester materials which have the characteristics of synthetic leather and are obtained by subjecting a partially foamed polyester sheet to further foaming and then compressing it at a temperature below the Tg of the material.

EP-A-0 442 759 describes thermostable but rigid foamed polyester materials obtained from a partially foamed polyester material which is cooled at the outlet of the extruder to a temperature below the Tg of the material, so as to maintain crystallinity at relatively low values, lower than 15%, subsequently subjecting it to further foaming in an aqueous environment at temperatures above the Tg of the material and then heating it to temperatures above 100° C. in a non-aqueous environment.

The treatment with water causes the absorption of water, which then expands at a temperature above 100° C., thus producing the further foaming of the material.

U.S. Pat. No. 4,284,596 describes a process for preparing polyester foams starting from polyester resins with the addition of a polyepoxy, in which the resin, at the outlet of the extruder and while it is still in the molten state, is made to pass through a chamber at reduced pressure and is then solidified.

The reduced pressure (200–300 millibar) applied to the still-molten resin allows to obtain low-density foamed materials with cells having uniform shape and volume which are uniformly distributed within the mass of the foamed material. The resulting foam is not flexible.

A method has now been unexpectedly found which allows to obtain a wide range of foamed cellular materials from aromatic polyester resins having high flexibility and elastic recovery characteristics or which combine dimensional thermostability and flexibility.

The method according to the invention comprises the following steps:
  a) extrusion-foaming of a foamable aromatic polyester resin to obtain a foamed material with a bulk density between 50 and 700 kg/m$^3$;
  b) cooling of the foamed material at the outlet of the extruder to temperatures and with cooling rates which do not allow the material to reach a degree of crystallinity higher than 15%;
  c) heating of the material to a temperature above its Tg but below its melting point, if it is not already at such a temperature, with heating rates such as to prevent the material from reaching crystallinity values above 15%;
  d) vacuum treatment of the foamed material heated as in c), keeping it at a temperature which is higher than its Tg but lower than the melting point of the material for a time sufficient to determine a decrease in the bulk density of the material of at least 30% with respect to the density after step a);
  e) return of the material to atmospheric pressure, preferably after cooling it to ambient temperature whilst it is still under vacuum.

The material after step e) generally has a bulk density of less than 500 kg/m$^3$, preferably less than 100 kg/m$^3$.

The cooling of the material at the outlet of the extruder is preferably performed with water at cooling rates which maintain the crystallinity of the material between 5 and 12%.

It is also possible to cool the extruded material, for example, in the form of a panel with a thickness of 10 mm or more, bringing it to a temperature such that in the core of the panel the temperature corresponds to the one at which the material is to be subjected to the vacuum treatment (for example 180° C.), and to directly introduce the thus cooled material into the vacuum chamber.

The temperature above Tg to which the material is brought for the vacuum treatment is comprised for example between 80° and 180° C. By working at temperatures between approximately 80° and 130° C. it is possible to obtain even considerable decreases in density without significantly increasing the crystallinity of the material. Highly flexible materials, having good elastic recovery, are thus obtained.

By working at higher temperatures, for example 170–180° C., a considerable decrease in bulk density is still achieved together with a significant increase in crystallinity, which can reach 30–40% or more; at these values one obtains a material which is still flexible and has high dimensional thermostability characteristics.

The heating of the material to bring it to the temperature of the vacuum treatment can be performed in an air oven or with pressurized water vapor or with other means.

The duration of the vacuum treatment is such as to decrease the bulk density by at least 30% with reference to the density of the material after step b).

The times are generally between 2 and 20 minutes, preferably 15 to 20 minutes. For example, a time of 15 minutes produces decreases in bulk density of 70–80% or more starting from sheets 2–4 mm thick, either operating at temperatures of 90–130° C. or at higher temperatures (170–180° C.).

In the case of treatment at high temperatures (170–180° C.), if the treatment is continued for more than 15–20 minutes, for example 60 minutes, the material collapses and bulk density increases considerably.

By working at lower temperatures (80° C.) and increasing the duration of the treatment (60 minutes) the bulk density remains practically constant.

The vacuum to which the material is subjected is, by way of indication, 20–40 mbar; harder vacuums and less extreme vacuums can also be used.

The harder the vacuum, the greater the effect on the decrease in density, other conditions being equal.

Preferably, the material is cooled to ambient temperature while it is still under vacuum; this produces a greater decrease in density than with material cooled at atmospheric pressure.

The preparation of the foamed cellular material by means of extrusion-foaming processes of foamable polyester resins is performed according to conventional methods, for example by extruding the polyester resin in the presence of a polyfunctional compound, such as for example a dianhydride of a tetracarboxylic acid.

Pyromellitic dianhydride (PMDA) is a representative and preferred compound.

Methods of this type are described in U.S. Pat. No. 5,000,991 and U.S. Pat. No. 5,288,764, the description of which is included by reference.

As an alternative, and as a preferred method, the polyester resin is upgraded in the solid state in the presence of a dianhydride of a tetracarboxylic aromatic acid (PMDA is the preferred compound) under conditions allowing to obtain a resin with an intrinsic viscosity of more than 0.8 dl/g, melt viscosity higher than 2500 PA.s and melt strength of more than 8 cN.

The blowing agents that can be used are of a known type: they can be easily volatile liquid hydrocarbons, such as for example n-pentane, or inert gases, such as nitrogen and carbon dioxide, or chemical blowing compounds.

The blowing agents are generally used in amounts between 1 and 10% by weight on the resin.

The foamed material is generally extruded in the form of a sheet with a thickness of a few millimeters, by way of example 2–4 mm, or as a panel with a thickness of about 20–50 mm.

For "foamable polyester resin" it is herein intended a resin which has the above described rheological characteristics which make it foamable or a resin which is capable of developing these characteristics during extrusion.

The aromatic polyester resins to which the process of the invention is applied are obtained by polycondensation of a diol with 2–10 carbon atoms with a dicarboxylic aromatic acid, such as for example terephthalic acid or lower alkyl diesters thereof.

Polyethylene terephthalate and alkylene terephthalates copolymers in which up to 20% in moles of terephthalic acid units is replaced with units of isophthalic acid and/or naphthalene dicarboxylic acids are preferred resins.

The polyester resins, preferably polyethylene terephthalate and copolyethylene terephthalates, can be used in mixtures with other polymers such as polyamides, polycarbonates, polycarbonate and polyethylene glycol used in amounts preferably up to about 40% by weight on the blend. The polymer is extruded with the polyester resin in the presence of pyromellitic dianhydride or a similar anhydride in an amount between 0.1 and 2% by weight on the blend and the resulting alloy is then upgraded in the solid state at temperatures between 160° C. and 220° C.

An example of embodiment of the method is as follows.

The foamed material, once it has left an annular extrusion head, is fitted on a water-cooled sizing mandrel and then cut.

The resulting sheet is then pulled and rolled so as to form rolls from which the sheet is drawn continuously into a heating oven, in order to bring the temperature of the material to the chosen value, and is then introduced in a vacuum chamber from which it passes into a water bath whilst it is still under vacuum and is then returned to atmospheric pressure.

The characteristics of flexibility and dimensional thermostability of the material obtained with the method according to the invention depend on the degree of crystallinity and on the bulk density of the material.

The material offers flexibility and good elastic recovery when its crystallinity is below 15–20% and is more rigid, but provided with good dimensional thermostability, when the degree of crystallinity is around 30–35%.

The foamed cellular material that can be obtained with the method according to the present invention from foamed material with a bulk density of 50 to 700 kg/m³ by heating under vacuum to temperatures above the Tg of the material and below its melting point and by subsequent cooling has the following characteristics when subjected to constant-stress compression cycles (creep).

The characteristics, referred to a sheet of polyethylene terephthalate or copolyethylene terephthalates with 1–20% isophthalic acid units, with a crystallinity of less than 15% and a density of less than 100 kg/m$_3$, are:

maximum creep deformation: between 10 and 60%;

residual deformation after creep (after 120 minutes) 10 to 30%;

elastic recovery: between 40 and 80%.

The characteristics of a sheet with a density between 200 and 300 kg/m³ and with a crystallinity of less than 15% are:

maximum creep deformation: between 5 and 15%;

residual deformation after creep (after 120 minutes) 1 to 5%;

elastic recovery: between 75 and 90%.

The characteristics of the material with a crystallinity of more than 30%, particularly between 35 and 40%, are as follows, with reference to a sheet with a density of less than 100 kg/m³:

maximum dimensional stability temperature (stressed at <5% at 30 MPa): up to 150° C.;

maximum residual creep deformation: 6–20%;

residual deformation after creep for 120 minutes: 2–10%;

elastic recovery: 50–80%.

In the case of a polyethylene terephthalate material with 10% isophthalic acid, the maximum dimensional stability temperature is 148° C.

In the case of a material with a density of 200 to 300 kg/m³, the maximum dimensional stability temperature can reach 165° C., whilst the other properties remain similar to the material having a density of less than 200 kg/m³.

The measurements under constant stress were performed with the following method.

The tested samples were circular (disks with a diameter of approximately 20 mm).

A Perkin-Elmer dynamic-mechanical analyzer DMA 7 operating in helium (40 cc/min) was used in a configuration with parallel sample plates having a diameter of 10 mm.

The samples were then subjected to a series of constant-force stresses (creep) with a load of 2600 mN, as explained hereafter.

The sample was placed between the two plates and compressed with a practically nil load (1 mN).

The test began after approximately 5 min stabilization and consisted in applying a load of 2600 mN for 5 min (creep).

After this period, the load was removed instantaneously, allowing the sample to recover for 5 min.

This procedure was repeated 12 times for 120 minutes on the same sample, so as to produce a creep-recovery sequence.

The trace of the deformations undergone by the sample as a consequence of the individual creep-recovery steps was thus recorded.

During creep the sample underwent an elastic-plastic deformation which was (partially) recovered during the recovery step. The recovered part was considered to be an elastic deformation, whilst the unrecovered part remained as a permanent deformation (footprint).

It was found that after about 120 min of creep-recovery sequence the situation stabilized, producing constant values for elastic and permanent deformation.

The degree of crystallinity of the material was determined by DSC from the melting enthalpy of the material minus the crystallization enthalpy of the material and was compared with the enthalpy of the perfectly crystalline material (117 kJ/mole in the case of PET); in the case of crystallized material, crystallization enthalpy is equal to 0 J/g.

Rheological measurements were conducted at temperatures between 260 and 300° C. according to the type of polyester resin and to the rheological characteristics thereof, using a Geottferd capillary rheometer (reference should be made to U.S. Pat. No. 5,362,763 for a more detailed description of the method).

For example, when the polyester resin was a polyethylene terephthalate homopolymer, melt strength measurements were performed at 280° C.; they were instead performed at 260° C. when the resin was a copolyethylene terephthalate containing 10% isophthalic acid units.

Melt viscosity was determined at 300° C. for PET and at 280° C. for the copolyester.

Intrinsic viscosity was determined by means of solutions of 0.5 g of resin in 100 ml of a 60/40 mixture by weight of phenol and tetrachloroethane at 25° C., working according to ASTM 4063–86.

Bulk density was determined by the ratio between the weight and the volume of the foamed material.

The following examples are given to illustrate but not to limitate the invention.

EXAMPLE 1 (PRODUCTION OF FOAMED PET SHEET)

90 kg/h of polyethylene terephthalate homopolymer material having a melt strength of 100–150 cN, melt viscosity of 1800 Pa.s at 300° C. and 10 rad/sec and intrinsic viscosity of 1.25 dl/g, obtained by upgrading the polymer at 210° C. in the presence of 0.4% by weight of pyromellitic dianhydride (COBITECH™), were fed continuously to a two- screw extruder with a screw diameter of 90 mm.

A static mixer was placed after the screws to improve homogenization of the various components of the blend.

The temperatures set on the extruder were 280° C. in the melting region, 280° C. in the compression region, 270° C. in the mixing region and 265° C. at the extrusion head.

The screws of the extruder rotated at 18 rpm.

1.8% by weight of n-pentane (blowing agent) was added to the PET in the region of the extruder located after the melting of the polymer and thoroughly mixed with the polymeric matrix.

The PET/n-pentane composition, once mixed, was extruded through an annular head having a diameter of 90 mm and an extrusion opening of 0.23 mm. A sizing mandrel with a diameter of 350 mm and a length of 750 mm, cooled with water at 20° C., was arranged on the extrusion head.

The foamed material, once it had left the extrusion head, was fitted on the mandrel and cut. The resulting sheet was pulled and rolled to produce rolls.

The resulting sheet had the following characteristics:

| density | 0.145 g/cm³ |
| weight | 290 g/m² |
| thickness | 2 mm |
| average cell diameter | 300 μm |
| degree of crystallization | 8% |

EXAMPLE 2 (PRODUCTION OF FLEXIBLE FOAMED PET SHEET)

The sheet produced as described in example 1 was subjected to a treatment as described hereafter.

The sheet was drawn continuously in a heating oven which brought the sheet to a temperature of approximately 115° C. in approximately 5 minutes after which the sheet was introduced in a vacuum sizing device, where the residual pressure was approximately 30 mbar.

The retention time of the sheet inside the vacuum chamber was approximately 5 minutes: the thus treated sheet was then passed through a water bath kept at 25° C. and then returned to atmospheric pressure.

The characteristics of the resulting sheet were as follows:

| density | 0.029 g/cm³ |
| weight | 290 g/m² |
| thickness | 10 mm |
| degree of crystallization | 10% |

The sheet produced according to this treatment is termed "flexible sheet" and was subjected to compression measurement cycles in order to evaluate its compression resistance and its elastic recovery. All tests were performed in parallel with the sheet produced during the first step, which is termed "base sheet".

Table 1 lists the values found during these characterizations.

TABLE 1

|  | BASE SHEET | FLEXIBLE SHEET |
| --- | --- | --- |
| Maximum creep deformation (%) | 6.4 | 39.6 |
| Residual deformation after creep (after 120 minutes) (%) | 4.1 | 22.4 |
| permanent deformation (%) | 64.1 | 56.6 |
| elastic recovery (%) | 35.9 | 43.4 |

These measurements were performed by means of a thermomechanical analyzer by subjecting the samples to 12 consecutive compression and decompression cycles.

EXAMPLE 3 (PRODUCTION OF THERMOSTABLE FLEXIBLE FOAMED PET SHEET)

The sheet produced in example 1 was subjected to a treatment as described hereafter.

The sheet was pulled continuously in a heating oven, which brought the sheet to a temperature of approximately 125° C. in approximately 5 minutes; after this, the sheet was introduced in a sizing device under vacuum, in which the residual pressure was approximately 30 mbar. The retention time of the sheet inside the vacuum chamber was approximately 8 minutes; the sheet was kept at a temperature of 180° C.

Before leaving the chamber under vacuum, the thus treated sheet was passed through a bath of water kept at 25° C. and then returned to atmospheric pressure.

The characteristics of the resulting sheet are as follows:

| density | 0.033 g/cm³ |
| weight | 290 g/m² |
| thickness | 8.8 mm |
| degree of crystallization | 35% |

The sheet produced according to this treatment, termed "thermostable flexible sheet", was subjected to compression measurement cycles to evaluate both compression resistance and elastic recovery as well as temperature-dependent deformation.

All tests were conducted in parallel with the sheet produced during the first step, which is termed "base sheet".

Table 2 lists the values found during these characterizations.

TABLE 2

|  | BASE SHEET | THERMOSTABLE FLEXIBLE SHEET |
|---|---|---|
| Maximum dimensional stability temperature (stress <5%) at 30000 Pa | <90° C. | <150° C. |
| Maximum creep deformation (%) | 6.4 | 11.6 |
| Residual deformation after creep (after 120 min) (%) | 4.1 | 3.9 |
| permanent deformation (%) | 64.1 | 33.6 |
| elastic recovery (%) | 35.9 | 66.4 |

These measurements were performed by means of a thermomechanical analyzer.

EXAMPLE 4 (PRODUCTION OF A THERMOSTABLE FLEXIBLE FOAMED PET SHEET: WATER AT 125° C.)

The sheet produced as described in example 1 was subjected to a treatment as described hereafter.

The sheet was pulled continuously and heated by means of water at 125° for 5 minutes, after which the sheet was introduced in a sizing device under vacuum, in which the residual pressure was approximately 30 mbar.

The retention time of the sheet inside the chamber under vacuum was approximately 8 minutes. The sheet was kept at a temperature of 180° C. before leaving the chamber under vacuum and then passed through a bath of water kept at 25° and then returned to atmospheric pressure.

The characteristics of the resulting sheet were:

| density | 0.038 g/cm³ |
|---|---|
| weight | 290 g/m² |
| thickness | 7.6 mm |
| degree of crystallization | 38% |

The sheet produced according to this treatment, termed "thermostable flexible sheet", was subjected to compression measurement cycles in order to evaluate both compression resistance and elastic recovery as well as temperature-dependent deformation. All tests were conducted in parallel with the sheet produced during the first step, which is termed "base sheet".

Table 3 lists the values observed during these characterizations.

TABLE 3

|  | BASE SHEET | THERMOSTABLE FLEXIBLE SHEET |
|---|---|---|
| Maximum dimensional stability temperature (stress <5%) at 30000 Pa | <90° C. | <160° C. |
| Maximum creep deformation (%) | 6.4 | 10 |
| Residual deformation after creep (after 120 min) (%) | 4.1 | 3.7 |
| permanent deformation (%) | 64.1 | 37 |
| elastic recovery (%) | 35.9 | 63 |

These measurements were conducted with a thermomechanical analyzer.

EXAMPLE 5 (PRODUCTION OF A FOAMED PET PANEL)

90 kg/h of copolyethylene terephthalate material containing 10% by weight of isophthalic acid with a melt strength of 100–150 cN, intrinsic viscosity of 1.25 dl/g and melt viscosity of 1800 Pa.s at 280° C. (obtained by upgrading the polymer at 280° C. in the presence of 0.4% by weight of pyromellitic dianhydride (COBITECH™) were fed continuously in a twin-screw extruder with a screw diameter of 90 mm.

A static mixer was arranged downstream of the screws in order to improve the homogenization of the various components of the blend.

The temperatures set on the extruder were 260° C. in the melting region, 250° C. in the compression region, 240° C. in the mixing region and 225° C. in the extrusion region.

The screws of the extruder rotated at 18 rpm.

2.4% by weight of blowing agent 134a (1,1,1,2 tetrafluoroethane) was added to the PET in the region of the extruder located after the melting of the polymer and thoroughly mixed with the polymeric matrix.

The PET/134a composition, once mixed, was extruded through a flat head.

The resulting panel had the following characteristics:

| density | 0.115 g/cm³ |
|---|---|
| thickness | 22 mm |
| average cell diameter | 280 μm |
| degree of crystallization | 8% |

EXAMPLE 6 (PRODUCTION OF A FLEXIBLE FOAMED PET PANEL)

The panel produced as described in example 5 was subjected to a treatment performed a few seconds after extrusion as described hereafter.

The extruded panel was cooled in the sizing region, and once a temperature of 180° C. had been reached in the core of the panel, said panel was inserted in a sizing device under vacuum, where the residual pressure was approximately 30 mbar. The residence time of the panel inside the chamber under vacuum was approximately 5 minutes. The panel was kept at a temperature of approximately 120° C. before leaving the chamber under vacuum and then was made to pass through a bath of water kept at 25° C. and then returned to atmospheric pressure.

The characteristics of the resulting panel were:

| | |
|---|---|
| density | 0.030 g/cm³ |
| thickness | 55 mm |
| degree of crystallization | 10% |

The resulting panel (termed "flexible panel") was subjected to compression measurement cycles in order to evaluate compression resistance and elastic recovery. All tests were conducted in parallel on the panel produced during the first step (base panel).

Table 4 lists the measured values:

TABLE 4

| | BASE PANEL | FLEXIBLE PANEL |
|---|---|---|
| Maximum creep deformation (%) | 2.4 | 24 |
| Residual deformation after creep (after 120 min) (%) | 1.6 | 5.7 |
| permanent deformation (%) | 66 | 23.7 |
| elastic recovery (%) | 34 | 76.3 |

EXAMPLE 7 (PRODUCTION OF A THERMOSTABLE FLEXIBLE FOAMED PET PANEL)

The panel produced as described in example 5 was subjected to a treatment performed a few seconds after extrusion, as described hereafter.

The extruded panel was cooled in the sizing region and once it had reached a temperature of 180° C. in the core of the panel it was introduced in a sizing device under vacuum, where the residual pressure was approximately 30 mbar. The residence time of the panel inside the chamber under vacuum was approximately 10 minutes. The panel was kept at a temperature of 180° C. and before leaving the chamber under vacuum the panel was passed through a bath of water kept at 25° C. and then returned to atmospheric pressure.

The characteristics of the resulting panel were as follows:

| | |
|---|---|
| density | 0.038 g/cm³ |
| thickness | 52 mm |
| degree of crystallization | 36% |

The panel produced according to this treatment (termed "thermostable flexible panel") was subjected to compression measurement cycles to evaluate both compression resistance and elastic recovery as well as temperature-dependent deformation. All tests were conducted in parallel on the panel produced during the first step (base panel).

Table 5 lists the measured values.

TABLE 5

| | BASE PANEL | THERMOSTABLE FLEXIBLE PANEL |
|---|---|---|
| Maximum dimensional stability temperature (stress <5%) at 30000 Pa | <80° C. | <148° C. |
| Maximum creep deformation (%) | 2.4 | 16 |
| Residual deformation after creep (after 120 min) (%) | 1.6 | 5.1 |
| permanent deformation (%) | 66 | 31.9 |
| elastic recovery (%) | 34 | 68.1 |

EXAMPLE 8 (PRODUCTION OF FOAMED PET SHEET)

90 kg/h of polyethylene terephthalate homopolymer (COBITECH™) used in example 1 were fed continuously to a twin-screw extruder with a screw diameter of 90 mm.

A static mixer was placed downstream of the screws in order to improve the homogenization of the various components of the blend.

The temperatures set on the extruder were 280° C. in the melting region, 280° C. in the compression region, 270° C. in the mixing region and 265° C. on the extrusion head.

The screws of the extruder rotated at 15 rpm.

2.5% by weight of nitrogen (blowing agent) was added to the PET in the region of the extruder located after the melting of the polymer and was thoroughly mixed in with the polymeric matrix.

The PET/$N_2$ composition, once mixed, was extruded through an annular head having a diameter of 120 mm and an extrusion opening of 0.14 mm.

A sizing mandrel with a diameter of 350 mm and a length of 750 mm, cooled with water at 20° C., was placed on the extrusion head.

The foamed material, after leaving the extrusion head, was fitted on the mandrel and cut. The resulting sheet was pulled and rolled to produce rolls.

The resulting sheet had the following characteristics:

| | |
|---|---|
| density | 0.400 g/cm³ |
| weight | 500 g/m² |
| thickness | 1.25 mm |
| average cell diameter | 130 µm |
| degree of crystallization | 10% |

EXAMPLE 9 (PRODUCTION OF A SHEET OF FLEXIBLE FOAMED PET)

The sheet produced as described in example 8 was subjected to a treatment as described hereinafter.

The sheet was pulled continuously in a heating oven which brought the sheet to a temperature of approximately 115° C. in approximately 3 minutes, after which the sheet was placed in a sizing device under vacuum, in which residual pressure was approximately 30 mbar. The residence time of the sheet was approximately 5 minutes and the temperature was kept at 115° C. Before leaving the chamber under vacuum, the sheet thus treated was passed through a water bath kept at 25° C. and then returned to atmospheric pressure.

The characteristics of the resulting sheet were as follows:

| | |
|---|---|
| density | 0.260 g/cm³ |
| weight | 500 g/m² |
| thickness | 1.95 mm |
| degree of crystallization | 11% |

The sheet produced according to this treatment (termed "$N_2$ flexible sheet") was subjected to compression measurement cycles in order to evaluate both compression resistance and elastic recovery. All tests were conducted in parallel on the sheet produced during the first step ($N_2$ base sheet).

Table 6 lists the values found during these characterizations.

TABLE 6

| | $N_2$ BASE SHEET | $N_2$ FLEXIBLE SHEET |
|---|---|---|
| Maximum creep deformation (%) | 2.9 | 8.5 |
| Residual deformation after creep (after 120 min) (%) | 0.8 | 1.2 |
| permanent deformation (%) | 27.6 | 14.1 |
| elastic recovery (%) | 72.4 | 85.9 |

These measurements were performed by means of a thermomechanical analyzer, subjecting the samples to 12 consecutive compression and decompression cycles.

EXAMPLE 10 (PRODUCTION OF A SHEET OF THERMOSTABLE FLEXIBLE FOAMED PET)

The sheet produced in example 8 was subjected to a treatment as described hereafter.

The sheet was pulled continuously in a heating oven which brought the sheet to a temperature of 115° C. in approximately 3 minutes, after which the sheet was introduced in a sizing device under vacuum, where the residual pressure was approximately 30 mbar. The residence time of the sheet inside the chamber under vacuum was approximately 5 minutes; the sheet was kept at a temperature of 180° C.

Before leaving the chamber under vacuum, the sheet was passed through a water bath kept at 25° C. and then returned to atmospheric pressure.

The characteristics of the resulting sheet were:

| | |
|---|---|
| density | 0.243 g/cm³ |
| weight | 500 g/m² |
| thickness | 2.05 mm |
| degree of crystallization | 37% |

The sheet produced according to this treatment (termed "$N_2$ thermostable flexible sheet") was subjected to compression measurement cycles in order to evaluate resistance to compression and elastic recovery as well as temperature-dependent deformation. All tests were conducted in parallel on the sheet produced during the first step (base sheet).

Table 7 lists the values found during these characterizations.

TABLE 7

| | $N_2$ BASE SHEET | $N_2$ THERMOSTABLE FLEXIBLE SHEET |
|---|---|---|
| Maximum dimensional stability temperature (stress <5%) at 30000 Pa | <90° C. | <165° C. |
| Maximum creep deformation (%) | 2.9 | 7.4 |
| Residual deformation after creep (after 120 min) (%) | 0.8 | 1.7 |
| permanent deformation (%) | 27.8 | 24 |
| elastic recovery (%) | 72.4 | 76 |

These measurements were taken with a thermomechanical analyzer.

COMPARISON EXAMPLE 1

A sheet produced as described in example 1 of U.S. Pat. No. 5,110,844 was subjected to thermomechanical characterization and compared with the sheet of example 4.

The results of these characterizations are listed in Table 8.

TABLE 8

| | BASE SHEET | THERMO-STABLE FLEXIBLE SHEET | SHEET ACCORDING TO EXAMPLE 1 OF US-A-5 110 884 |
|---|---|---|---|
| Maximum dimensional stability temperature (stress <5%) at 30000 Pa | <90° C. | <160° C. | <90° C. |
| Maximum creep deformation (%) | 6.4 | 10 | 6.1 |
| Residual deformation after creep (after 120 min) (%) | 4.1 | 3.7 | 4 |
| permanent deformation | 64.1 | 37 | 65.6 |
| elastic recovery (%) | 35.9 | 63 | 34.4 |

The measurements were taken with a thermomechanical analyzer.

COMPARISON EXAMPLE 2

A sheet produced as described in Example 1 of U.S. Pat. No. 4,284,596 was subjected to thermomechanical characterization and compared with the sheet of example 4.

The results of these characterizations are listed in Table 9.

TABLE 9

|  | BASE SHEET | THERMO-STABLE FLEXIBLE SHEET | SHEET ACCORDING TO EXAMPLE 1 OF US-A-4 284 596 |
|---|---|---|---|
| Maximum dimensional stability temperuture (stress <5%) at 30000 Pa | <90° C. | <160° C. | <90° C. |
| Maximum creep deformation (%) | 6.4 | 10 | 2.2 |
| Residual deformation after creep (after 120 min) (%) | 4.1 | 3.7 | 2 |
| permanent deformation (%) | 64.1 | 37 | 91 |
| elastic recovery (%) | 35.9 | 63 | 9 |

The measurements were taken with a thermomechanical analyzer.

We claim:

1. A foamed cellular material derived from aromatic polyester resins, obtained from aromatic polyester foamed cellular material having a bulk density of 50 to 700 kg/m$^3$ by heating under vacuum at temperatures higher than the Tg of the material and lower than the melting point thereof, for a time sufficient to achieve a decrease in bulk density of at least 30%.

2. A foamed cellular material according to claim 1, having a degree of crystallinity of less than 15%.

3. A foamed cellular material according to claim 1, having a degree of crystallinity of more than 30%.

4. A foamed cellular material according to claim 2, having a degree of crystallinity between 5 and 12%.

5. A foamed cellular material according to claim 3, having a degree of crystallinity between 30 and 40%.

6. A foamed cellular material according to claim 1, having a bulk density of less than 100 kg/m$^3$.

7. A foamed cellular material according to claim 6, having a degree of crystallinity of less than 15%.

8. A foamed cellular material according to claim 6, having a degree of crystallinity of more than 30%.

9. A foamed cellular material according to claim 1, having a bulk density of 100 to 500 kg/m$^3$.

10. A foamed cellular material according to claim 1, obtained from polyester resins chosen among polyethylene terephthalate and copolyethylene terephthalates containing up to 20% of units derived from isophthalic acid.

11. A foamed cellular material according to claim 1, obtained from polyester resins in the form of an alloy with polymers chosen among polyamides, polycarbonates and polycaprolactone, obtained by extruding the resin and the polymer in the presence of pyromellitic dianhydride and then upgrading the alloy at temperatures between 160° and 220° C.

12. A foamed cellular material according to claim 11, wherein the polyester resin is polyethylene terephthalate or copolyethylene terephthalate containing up to 20% of units derived from isophthalic acid in the form of an alloy with a polymer chosen among polyamides, polycarbonates and polycaprolactone used in an amount of up to 40% by weight on the total.

13. A foamed cellular material derived from aromatic polyester resins having a bulk density of less than 100 kg/m$^3$, a degree of crystallinity of less than 15% and the following tensile properties:
    maximum creep deformation between 10 and 60%;
    residual deformation after creep for 120 minutes between 10 and 30%;
    elastic recovery between 40 and 90%.

14. A foamed cellular material derived from aromatic polyester resins having a bulk density of 200 to 300 kg/m$^3$, a degree of crystallinity of less than 15% and the following tensile properties:
    maximum creep deformation between 5 and 15%;
    residual deformation after creep for 120 minutes between 1 and 5%;
    elastic recovery between 75 and 90%.

15. A foamed cellular material from aromatic polyester resins having a bulk density of less than 100 kg/m$^3$, a degree of crystallinity of more than 30% and the following dimensional thermostability and tensile properties:
    maximum shape permanence temperature: up to 150° C.;
    maximum creep deformation: between 6 and 20%;
    residual deformation after creep for 120 minutes: between 2 and 10%;
    elastic recovery: between 50 and 80%.

16. A foamed cellular material according to claim 13, having a degree of crystallinity of 35 to 40% and a maximum dimensional stability temperature of up to 165° C.

17. A foamed cellular material derived from aromatic polyester resins having a bulk density of 100 to 300 kg/m$^3$, a degree of crystallinity of 35 to 40% and a maximum dimensional stability temperature of up to 165° C.

18. A foamed cellular material according to claim 11, obtained from polyester resins chosen among polyethylene terephthalate and copolyethylene terephthalate containing up to 20% of isophthalic acid units.

19. A foamed cellular material according to claim 1, in the form of a sheet with a thickness of 1 to 3 mm or of a panel with a thickness of 10 to 50 mm.

20. A foamed cellular material according to claim 1, obtained from aromatic polyester resins having an intrinsic viscosity of more than 0.8 dl/g, a melt viscosity of more than 2500 Pa.s and a melt strength of more than 8 cN.

21. A method for preparing the foamed cellular materials according to claim 1, comprising the following steps:
    a) extrusion-foaming of a foamable aromatic polyester resin;
    b) cooling of the foamed material at the outlet of the extruder to a temperature and with cooling rates such that the material does not reach a degree of crystallinity of more than 15%;
    c) heating of the material, if it is not already at such a temperature at the outlet of the extruder after step b), to temperatures higher than the Tg of the material but lower than its melting point, with heating rates such that the crystallinity of the material remains lower than 15%;
    d) vacuum treatment of the thus heated material, keeping it under vacuum at a temperature which is higher than the Tg of the material but lower than the melting point for a time which is sufficient to achieve a decrease in the bulk density of the material of at least 30% with respect to the density of the material after step b);
    e) return of the material to atmospheric pressure.

22. A method according to claim 21, wherein the material, after vacuum treatment, is cooled to ambient temperature and kept under vacuum.

23. A method according to claim 21, wherein the vacuum is between 10 and 50 mbar and the temperature of the vacuum heating is 90 to 180° C.

24. A method according to claim 21, wherein the material is obtained from a polyester resin chosen between polyethylene terephthalate and copolyethylene terephthalate containing up to 20% of units derived from isophthalic acid.

25. A foamed cellular material according to claim 2, having a bulk density of 100 to 500 kg/m$^3$.

26. A foamed cellular material according to claim 3, having a bulk density of 100 to 500 kg/m$^3$.

27. A foamed cellular material according to claim 13, obtained from polyester resins chosen among polyethylene terephthalate and copolyethylene terephthalate containing up to 20% of isophthalic acid units.

28. A foamed cellular material according to claim 14, obtained from polyester resins chosen among polyethylene terephthalate and copolyethylene terephthalate containing up to 20% of isophthalic acid units.

29. A foamed cellular material according to claim 15, obtained from polyester resins chosen among polyethylene terephthalate and copolyethylene terephthalate containing up to 20% of isophthalic acid units.

* * * * *

UNITED STATES PATENT AND TRADEMARK OFFICE
CERTIFICATE OF CORRECTION

PATENT NO.     : 6,054,500
DATED          : April 25, 2000
INVENTOR(S)    : Hussain Al Ghatta et al.

It is certified that error appears in the above-identified patent and that said Letters Patent is hereby corrected as shown below:

<u>Title page,</u>
Item [12], delete "Ghatta et al" and insert -- Al Ghatta et al --.

Signed and Sealed this

Second Day of March, 2004

JON W. DUDAS
*Acting Director of the United States Patent and Trademark Office*